United States Patent

Tamura et al.

Patent Number: 5,183,675
Date of Patent: Feb. 2, 1993

[54] PROCESS FOR PRODUCING SALAD OIL

[75] Inventors: Koichi Tamura, Yokohama; Nobuo Taguchi, Yokosuka; Satoshi Tashiro, Yokohama, all of Japan

[73] Assignee: The Nisshin Oil Mills, Ltd., Tokyo, Japan

[21] Appl. No.: 727,445

[22] Filed: Jul. 9, 1991

[30] Foreign Application Priority Data

Nov. 28, 1990 [JP] Japan ................................ 2-327113

[51] Int. Cl.$^5$ ............................................. A23D 9/02
[52] U.S. Cl. ...................................... 426/33; 435/135
[58] Field of Search ........................... 426/33; 435/135

[56] References Cited

U.S. PATENT DOCUMENTS 4,416,991 11/1983 Matsuo et al. .................... 426/33 X
4,420,560 12/1983 Matsuo ............................. 426/33 X

OTHER PUBLICATIONS

Japanese Kokai 61-293389, Published Dec. 24, 1986, (Nissin Oil Mills, Ltd.), 5 pages.
Swern, Bailey's Industrial Oil and Fat Products, vol. I, 4th Ed. 1979, John Wiley & Sons: New York, pp. 374-382.
Industrial Oil and Fat Products, Tables 6.57 and 6.58 on pp. 378 and 379, vol. 1, 4th Edition published by John Wiley & Sons.

Primary Examiner—Joseph Golian
Attorney, Agent, or Firm—Oblon, Spivak, McClelland, Maier & Neustadt

[57] ABSTRACT

A process for producing a salad oil comprises transesterifying a mixture of (A) an oil or fat produced from palm oil and having the following characteristics:

| iodine value: | 55 to 75 |
|---|---|
| constituent fatty acids: | |
| palmitic acid: | 30 to 42% by weight |
| oleic acid: | 42 to 48% by weight |
| linoleic acid: | 11 to 20% by weight |
| tripalmitin: | 2% by weight or less |
| open-tube melting point: | 5 to 25° C. | and (B) a liquid edible oil other than the component (A) in a weight ratio of 5:95 to 95:5 with immobilized lipase having 1,3-specificity in the absence of solvent and then fractionating the product in the absence of solvent. Thereby, the salad oil can be efficiently derived from palm oil which is a solid oil and the relative amount of the starting material obtained from palm oil in the salad oil can be increased. The thus-produced salad oil has a satisfactory cooling resistance.

7 Claims, No Drawings

PROCESS FOR PRODUCING SALAD OIL

BACKGROUND OF THE INVENTION

The present invention relates to a process for producing a salad oil which is a useful liquid oil from a specified oil or fat obtained by treating palm oil.

Solid fats which are in solid form at ambient temperature are usually converted into liquid oils to make the use thereof convenient. Solid oils such as palm oil are recently mass-produced and the quantity thereof will be increased in future. Therefore, development of new effective utilization of them is eagerly demanded. However, use of the solid fats per se is limited. Under these circumstances, it will be quite significant to produce a liquid salad oil from palm oil which is a solid fat.

Various processes were generally tried for liquefying solid fats. The most simple process comprises merely mixing a solid fat with a liquid oil. However, this process is not so effective, since the amount of the solid fat which can be incorporated into the liquid oil is limited to an extremely small amount in order to obtain the intended oil. This process is, therefore, not effective.

Another known process comprises fractionating a solid fat to take a low-melting point fraction, but it will be apparent from, for example, oleins obtained by fractionation of palm oil that even the low-melting point fraction tends to be in solid form in seasons other than summer and thus the product thus obtained is only a semi-liquid oil.

Under these circumstances, various processes based on transesterification reaction with lipase were recently proposed For example, Japanese Patent Unexamined Published Application (hereinafter referred to as "J. P. KOKAI") No. Sho 61-293389 discloses transesterification of palm oil and an odorless liquid starting oil with lipase, taking advantage of 1,3-specificity. However, this process is not always satisfactory, since the amount of palm oil which can be incorporated is only 50% at the most.

J. P. KOKAI Nos. Sho 49-107304 and 64-81899 describe a process wherein a liquid oil is incorporated into an oil obtained from palm oil by fractionation and transesterification of them is conducted. However, the obtained oil has an insufficient cooling resistance.

SUMMARY OF THE INVENTION

A primary object of the present invention is to provide a process for efficiently producing a salad oil from palm oil which is a solid fat without posing the above-described problems.

This and other objects of the present invention will be apparent from the following description and Examples.

The present invention was completed on the basis of a finding that a salad oil can be efficiently produced by treating palm oil to produce an oil or fat having specified characteristics, homogeneously mixing the oil or fat with a liquid edible oil having another composition and subjecting them to a 1,3-specific transesterification between fatty acid residues constituting the oil or fat and fatty acid residues constituting the liquid edible oil and that the above-described object can be thus efficiently attained.

The present invention provides a process for producing a salad oil which comprises transesterifying a mixture of (A) an oil or fat produced from palm oil and having the following characteristics:

| | |
|---|---|
| iodine value: | 55 to 75 |
| constituent fatty acids: | |
| palmitic acid: | 30 to 42% by weight |
| oleic acid: | 42 to 48% by weight |
| linoleic acid: | 11 to 20% by weight |
| tripalmitin: | 2% by weight or less |
| open-tube melting point: | 5 to 25° C. | and (B) a liquid edible oil other than the component (A) in a weight ratio of 5:95 to 95:5 with immobilized lipase having 1,3-specificity in the absence of solvent and then fractionating the product in the absence of solvent.

DESCRIPTION OF THE PREFERRED EMBODIMENTS

The oils and fats (A) having the above-described characteristics are preferably those having an iodine value of 57 to 75, amount of palmitic acid residue of 30 to 40% (by weight; the same shall apply hereinafter) and open-tube melting point of 5 to 25%. The oils and fats used as component (A) in the present invention are produced from palm oil by dry fractionation or solvent fractionation method under conditions controlled so that the above-described characteristics will be obtained. It is important in the present invention that the oil or fat having the above-described characteristics is used. When a starting oil having characteristics not within the above-described ranges is used, the object of the invention cannot be attained.

The iodine value, fatty acid composition and open-tube melting point are determined according to standard oil and fat analysis methods (edited by Yukagaku Kyokai) and the amount of tripalmitin is determined according to high-performance liquid chromatography.

The immobilized lipase having 1,3-specificity usable in the present invention include, for example, Lipozyme (a product of Novo Co.) which is produced by immobilizing a lipase having 1,3-specificity derived from Mucor Miehei by using an ion exchange resin as carrier. The immobilized lipase usable in the present invention is not limited to Lipozyme but any lipase having 1,3-specificity which is carried on a known carrier is usable.

The liquid edible oils usable as the component (B) in the present invention include soybean oil, rape seed oil, cotton seed oil, corn oil, safflower oil, rice oil, sunflower oil and sesame oil. They can be used either singly or in the form of a mixture of two or more of them.

Both oil components (A) and (B) used in the present invention may be refined oils, bleached oils and deodorized oils. The weight ratio of the oil or fat used as the component (A) to the liquid edible oil used as the component (B) in the present invention is 5:95 to 95: 5, preferably 55:45 to 90:10 in order to attain the object of the present invention which is to produce a liquid oil having a cooling resistance satisfying the standard of salad oils (the Japanese Agricultural Standard that it is not clouded after leaving to stand at 0° C. for 5.5 h).

A salad oil can be produced in a quite satisfactory yield in an practically and economically advantageous manner by subjecting the mixture of the substances in the above-described weight ratio to the transesterification.

Namely, when the amount of the palm oil or fat in the starting mixture exceeds 95 parts for 5 parts of the liquid edible oil in the mixture, the salad oil cannot be recovered in a satisfactory yield in the subsequent fractionation step. When the ratio of the oil or fat to the liquid edible oil is higher than 55:45, the salad oil can be produced in an economically more advantageous manner.

The transesterification reaction in the present invention is conducted at about 60° C. to 80° C., particularly at around 70° C.

From a commonsense point of view, a high temperature is desirable for increasing the reaction (transesterification reaction) velocity However, an excessively high temperature will pose a problem of deactivation.

It is desirable in the present invention that the homogeneous oil mixture is formulated so that it will be saturated with water at the reaction temperature.

By the saturation with water, the amount of free fatty acids by-produced in the course of the reaction can be kept small and the activity of the immobilizedlipase can be kept for a quite long period of time.

The transesterification can be conducted either batchwise or continuously in the present invention. However, the continuous process wherein a column filled with the immoblized lipase is used is suprior from the viewpoints of apparatus and efficiency.

When the transesterification reaction is conducted batchwise, heating at a relatively high temperature for a long period of time is required in order to sufficiently conduct the reaction particularly when a solid fat is used and, in addition, the amount of free fatty acids formed by the hydrolysis (side reaction) is increased, while the heating time is shorter and the amount of the by-produced fatty acids is small in the continuous process.

In the present invention, the solid fat is separated by fractionation from the modified product thus produced.

The fractionation is conducted in the absence of solvent, which is one of the characteristic features of the present invention. To produce the salad oil intended in the present invention (i.e. salad oil which is not clouded after leaving to stand at 0° C. for 5.5 h according to the Japanese Agricultural Standard), the reaction mixture is slowly cooled to 3° C. to 10° C., preferably around 5° C. to precipitate the solid components from the mixture and the solid fat is fractionated by filtration by an ordinary method.

According to the present invention, the relative amount of the starting material derived from palm oil can be increased to an extent larger than that of ordinary processes and the salad oil produced by the present invention has a satisfactory cooling resistance.

The following Examples will further illustrate the present invention.

EXAMPLE 1

40% of an oil or fat produced by dry fractionation of palm oil and having an iodine value of 58.0, palmitic acid content of 39.8%, oleic acid content of 42.5%, linoleic acid content of 11.2%, tripalmitin content of 0.2% and open-tube melting point of 21.6° C. was homeneously mixed with 60% of rape seed oil. 360 g/h of the mixture was passed through a 1 l column filled with 300 g of Lipozyme (immobilized lipase of Novo Co.) to conduct the transesterification. The reaction product obtained in the initial stage (72 h) was taken out and then about 5 kg of the reaction product in the next stage was taken, dried and slowly cooled to 5° C. in 48 h and crystals thus formed were filtered out at that temperature. The yield of the liquid oil was 87%. Even when the liquid oil was cooled to 0° C. in ice/water for 30 h, it was not clouded to suggest that it had a sufficient cooling resistance as that required of the salad oil.

COMPARATIVE EXAMPLE 1

40 % of palm oil having an iodine value of 5.1, palmitic acid content of 44.0%, oleic acid content of 39.2%, linoleic acid content of 10.2%, tripalmitin content of 9.4% and open-tube melting point of 35° C. was homeneously mixed with 60% of the same rape seed oil as that used in Example 1. After the transesterification and slow cooling conducted in the same manner as that of Example 1, the liquid oil was obtained (yield: 78%). When it was cooled in the same manner as that of Example 1, it was clouded after 17 h.

COMPARATIVE EXAMPLE 2

40 % of the same oil produced from palm oil as that used in Example 1 was homogeneously mixed with 60% of the same rape seed oil as that used in Example 1. The mixture was slowly cooled to 5° C. in 48 h and then filtered at that temperature. The yield of the liquid was 58% which was far lower than that obtained in Example 1 and this process is practically unsatisfactory.

EXAMPLE 2

60 % of the same oil derived from palm oil as that used in Example 1 was homogeneously mixed with 40% of the same rape seed oil as that used in Example 1. 360 g/h of the mixture was passed through a 1 l column filled with 300 g of Lipozyme (immobilized lipase of Novo Co.) to conduct the transesterification. The reaction product obtained in the initial stage (72 h) was taken out and then about 5 kg of the reaction product in the next stage was taken, dried and slowly cooled to 5° C. in 48 h and crystals thus formed were filtered out at that temperature. The yield of the liquid oil was 70%. Even when the liquid oil was cooled to 0° C. in ice/water for 5.5 h, it was not clouded to suggest that it had a sufficient cooling resistance as that required of the salad oil.

COMPARATIVE EXAMPLE 3

60 % of the same oil derived from palm oil as that used in Example 1 was homogeneously mixed with 40% of the same rape seed oil as that used in Example 1. The mixture was cooled to 5° C. in 48 h. No liquid oil could be obtained by filtration.

EXAMPLE 3

A salad oil was prepared by the same method as in Example 1 except that rape seed oil was replaced by soybean oil. As a result, the yield of the liquid salad oil was 84 %. Even when the liquid oil was cooled to 0° C. in ice/water for more than 5.5 h, it was not clouded to suggest that it had a sufficient cooling resistance as that required of the salad oil.

EXAMPLE 4

A salad oil was prepared by the same method as in Example 1 except that rape seed oil was replaced by corn oil. As a result, the yield of the liquid salad oil was 85 %. Even when the liquid oil was cooled to 0° C. in ice/water for more than 5.5 h, it was not clouded to suggest that it had a sufficient cooling resistance as that required of the salad oil.

COMPARATIVE EXAMPLE 4

40 % of the same oil derived from palm oil as that used in Example 1 was homogeneously mixed with 60 % of the same soybean oil as that used in Example 3. The mixture was cooled to 5° C. in 48 h. As a result, the yield of the liquid oil was 59%.

COMPARATIVE EXAMPLE 5

40 % of the same oil derived from palm oil as that used in Example 1 was homogeneously mixed with 60 % of the same corn oil as that used in Example 4. The mixture was cooled to 5° C. in 48 h. As a result, the yield of the liquid oil was 55%.

What is claimed is:

1. A process for producing a salad oil which comprises transesterifying a mixture of (A) an oil or fat produced from palm oil and having the following characteristics:

| iodine value: | 55 to 75 |
|---|---|
| constituent fatty acids: | |
| palmitic acid: | 30 to 42% by weight |
| oleic acid: | 42 to 48% by weight |
| linoleic acid: | 11 to 20% by weight |
| tripalmitin: | 2% by weight or less |
| open-tube melting point: | 5 to 25° C. | and (B) a liquid edible oil other than the component (A) in a weight ratio of 5:95 to 95:5 with immobilized lipase having 1,3-specificity in the absence of solvent and then fractionating the product in the absence of solvent.

2. A process for producing a salad oil of claim 1 wherein the palm oil has the following properties:

| iodine value: | 57 to 75 |
|---|---|
| constituent fatty acids: | |
| palmitic acid: | 30 to 40% by weight |

3. A process for producing a salad oil of claim 1 wherein the oil and fat used as the component (A) is produced from palm oil by dry fractionation or solvent fractionation method.

4. A process for producing a salad oil of claim 1 wherein the liquid edible oil used as the component (B) is selected from the group consisting of soybean oil, rape seed oil, cotton seed oil, corn oil, safflower oil, rice oil, sunflower oil and sesame oil.

5. A process for producing a salad oil of claim 1 wherein the weight ratio of the oil or fat used as the component (A) to the liquid edible oil used as the component (B) is 55:45 to 90:10.

6. A process for producing a salad oil of claim 1 wherein the transesterification reaction is conducted at about 60° C. to 80° C.

7. A process for producing a salad oil of claim 1 wherein the fractionation is carried out in such that the reaction mixture is slowly cooled to 3° C. to 10° C. to precipitate the solid components from the mixture and the solid fat is fractionated by filtration.

* * * * *